W. BUDESHEIM & J. D. STINCHCOMB.
EMERGENCY TIRE FOR AUTOMOBILE WHEELS, &c.
APPLICATION FILED JUNE 2, 1909.
947,221.
Patented Jan. 25, 1910.
2 SHEETS—SHEET 1.
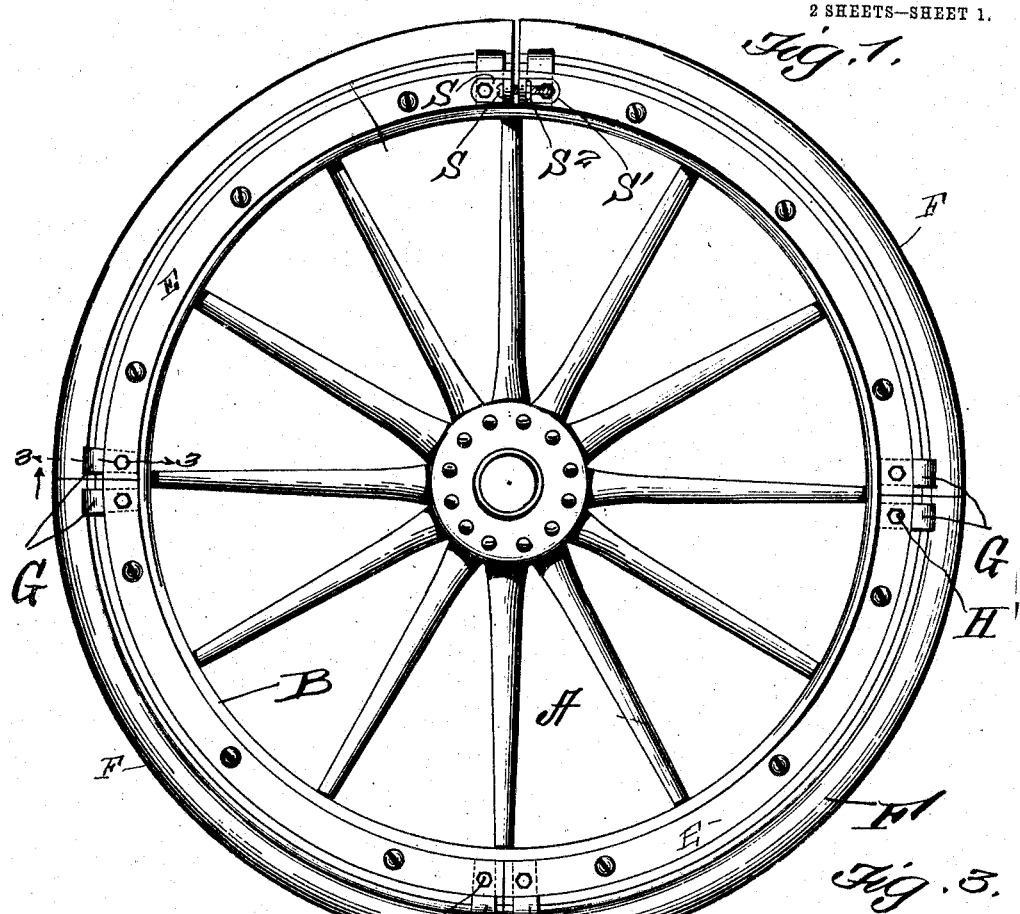
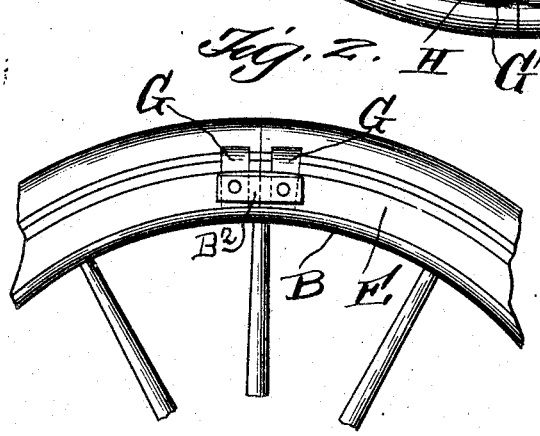
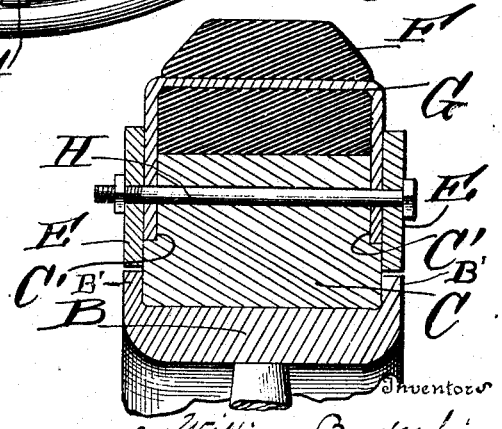

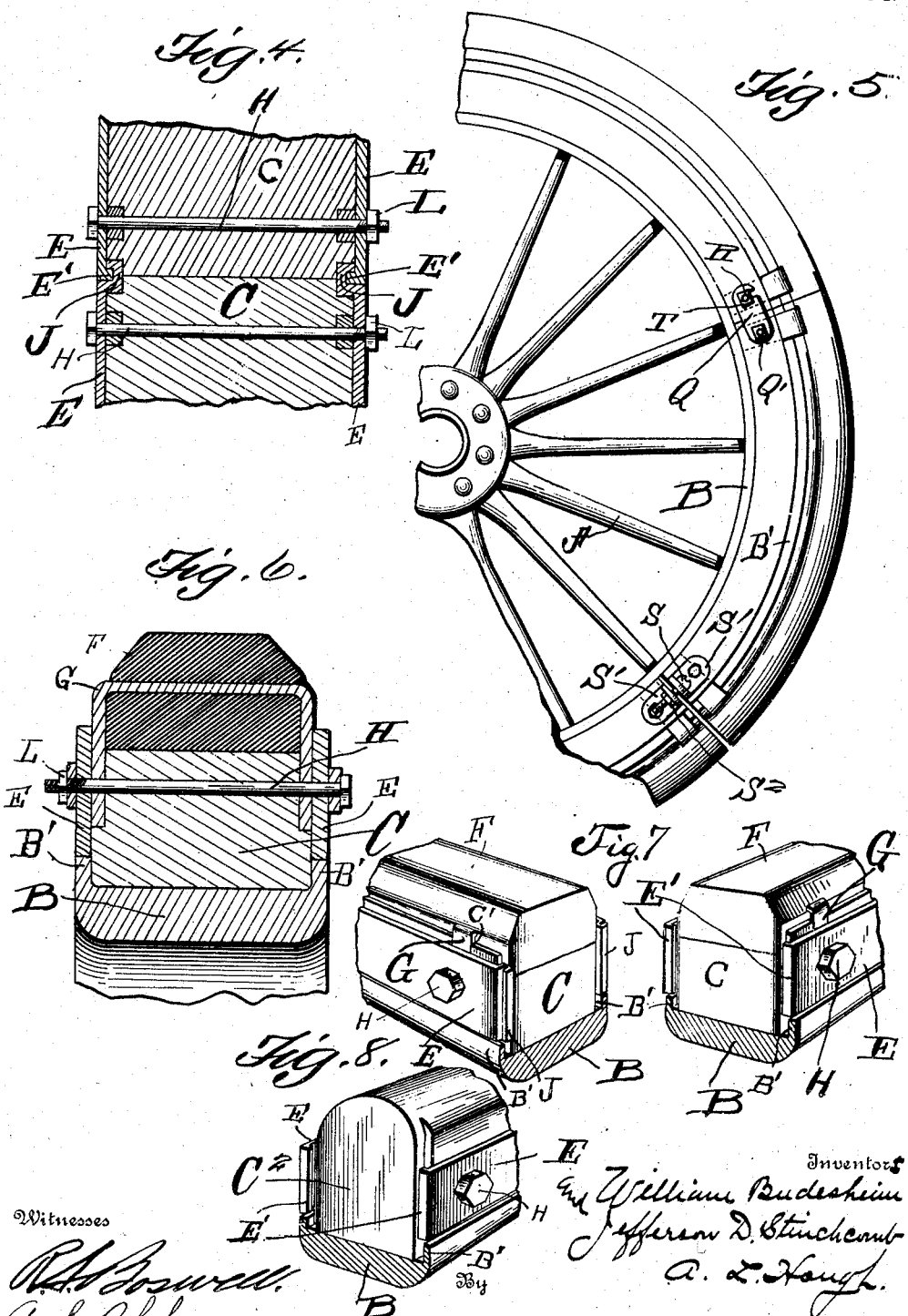

UNITED STATES PATENT OFFICE.

WILLIAM BUDESHEIM AND JEFFERSON D. STINCHCOMB, OF BALTIMORE, MARYLAND.

EMERGENCY-TIRE FOR AUTOMOBILE-WHEELS, &c.

947,221.

Specification of Letters Patent. Patented Jan. 25, 1910.

Application filed June 2, 1909. Serial No. 499,800.

*To all whom it may concern:*

Be it known that we, WILLIAM BUDE-SHEIM and JEFFERSON D. STINCHCOMB, citizens of the United States, residing in the city of Baltimore and State of Maryland, have invented certain new and useful Improvements in Emergency-Tires for Automobile-Wheels, &c.; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in emergency tires for automobiles and other vehicle wheels and comprises a simple and efficient device of this nature which may be readily and quickly applied to the rim of a wheel when a pneumatic tire fails, thus affording a temporary means for allowing a vehicle to be operated without injury to the rim or wheels.

Our invention comprises various other details of construction and combinations and arrangements of parts which will be hereinafter fully described and then specifically defined in the appended claims.

The invention is illustrated in the accompanying drawings, in which:—

Figure 1 is a side elevation of a wheel showing our improved emergency tire applied thereto. Fig. 2 is an enlarged detail view in elevation of a portion of the wheel. Fig. 3 is a sectional view on line 3—3 of Fig. 1. Fig. 4 is a sectional view showing the means for connecting the sections of the tire. Fig. 5 is a side elevation showing the modified form of means for holding the sections together and also clamping means for drawing the sections taut. Fig. 6 is a sectional view through the tire section and illustrating the means for holding the same in place. Fig. 7 is a detail view showing two of the sections illustrated in Fig. 4 disconnected, and Fig. 8 shows a modified form of the invention in which the tread section is made preferably of one piece of wood or other suitable fibrous material.

Reference now being had to the details of the drawings by letter, A designates an ordinary wheel with a curved rim B, and C, C are sections of the emergency tire which are curved to conform to the curvature of the rim and have their inner concaved edges of such a width as to fit snugly between the flanges B' of the rim in the manner shown clearly in Fig. 3 of the drawings. Fastened to each section C are the curved metallic segment plates E which are adapted, when the tire sections are drawn tightly in the groove of the rim, to move toward the latter. Suitable tread surfaces, designated by letter F and made preferably of rubber, are provided which are seated in the outer grooved convexed faces of the sections C and each of said tread surfaces F is transversely slotted to receive the retaining straps G, the ends of which are bent parallel to each other and seated in recesses C' formed in the opposite faces of the sections C and provided with registering apertures for the reception of the bolts H which also pass through apertures in the plates E and thus retain the tread tire sections in place.

Referring to Figs. 4 and 7 of the drawings, it will be noted that the plates E have corresponding ends angled as at E' which are fastened to the sections C and are adapted to interlock with slotted portions J upon the adjacent ends of similar plates.

In Fig. 2 of the drawings, I have shown a slightly modified form of a means for securing the meeting ends of the sections, consisting of a plate B², having apertures through which a bolt is passed for securing the meeting ends together.

In Fig. 5 of the drawings is shown a modified form of means for fastening the sections together in which a latch plate Q is pivotally mounted upon a pin Q' and has a hooked end adapted to engage a bolt R which, when connected thereto, is held in a locked relation by means of a threaded nut T mounted upon the end of said bolt R. The sections of the tire being fastened together, they are drawn taut by means of the bolts S which are passed through the apertures in the angled plates S' and upon which bolts S nuts S² are mounted, thus affording means for drawing the two meeting ends of the sections carrying the plates S' together and causing the various sections of the emergency tire to frictionally engage the circumference of the rim.

In Fig. 8 of the drawings, we have shown a slight modification of the invention in which, instead of utilizing a tread surface, we make the section C² of wood or other fiber dispensing entirely with the tread surface.

In adjusting the emergency tire to the rim, the sections having the slip joint connections shown in Fig. 4 are fastened together and also the ends of the sections with the coupling connection shown in Fig. 5, after which the ends having the plates S' are brought together and the screw S passed through registering apertures in the angled ends of the plates and a nut fitted upon the screw and tightened, thus drawing all of the sections securely against the rim of the wheel. It will be noted that, when the parts are drawn taut against the rim, the inner concaved sections C will bind tightly against the grooved circumference of the rim, thereby securely holding the parts in place.

What we claim to be new is:—

1. An emergency tire for automobile and other wheels comprising a series of curved segment tire blocks, an apertured tire section upon each of said blocks, an angled strap passing through each aperture of the tire section, curved segment plates engaging said straps and the opposite faces of said block, bolts passing through said plates, straps and blocks, nuts upon said bolts, the adjacent ends of said plates interlocking, and means for drawing the series of tire blocks against the rim of a wheel, as set forth.

2. An emergency tire for automobile and other wheels comprising a series of curved segment tire blocks having recesses in the opposite faces thereof, an apertured tire section upon each of said blocks, an angled strap passing through each aperture of the tire section, the ends of said straps seated in the recesses formed in the opposite faces of the blocks, the outer faces of the portions of said straps seated in said recesses being flush with the opposite faces of the blocks, interlocking curved segment plates engaging the outer faces of said straps and blocks, bolts passing through said plates, straps and blocks, nuts upon said bolts, and means for drawing the series of tire blocks taut against the rim of a wheel, as set forth.

In testimony whereof we hereunto affix our signatures in presence of two witnesses.

WILLIAM BUDESHEIM.
J. D. STINCHCOMB.

Witnesses:
JOHN R. HOOPER,
ADRIAN J. GRAPE.